Patented May 21, 1946

2,400,677

UNITED STATES PATENT OFFICE 2,400,677

CONTROL OF SLIME ORGANISMS

William W. Allen, Midland, Mich., assignor to The Dow Chemical Company, Midland, Mich., a corporation of Michigan No Drawing. Application August 12, 1943,
Serial No. 498,411

4 Claims. (Cl. 210—23)

The present invention is concerned with the control of slime organisms, and is particularly directed to a method for preventing the formation of slime bodies and deposits in circulating water systems by adding to the water a combination of toxic materials, and to a mixture of toxicants so employed.

The development of slime organisms in circulating water systems constitutes a major problem in power plants, sugar refineries, distilleries, pulp, paper, and paper-board mills, and other industries. The tendency for slimy deposits and slime bodies to clog pipes or conduits so as to interfere with the circulation of water, aqueous solutions, and suspensions and to discolor or otherwise contaminate products contacted therewith or with slime-encrusted machinery and apparatus has long been the subject of investigation by biochemists and others interested in the prevention and control of such conditions.

In pulp and paper mills, slimy growths frequently become associated with the cellulosic pulp and cause the discoloration and eventual decomposition of the finished product. Also, pipes, screens, calender boxes, and the like, at certain times of the year become so choked with gelatinous or semi-solid deposits as to necessitate temporary suspension of production and intensive cleaning and sterilizing operations. In air-conditioning systems, distilleries, power plants and the like, wherein cooling water is circulating through containers or coils, the deposits of micro-organisms not only obstruct the flow of liquids through the pipes, jets, valves, etc., but frequently lead to problems of corrosion where hydrogen sulfide-generating organisms are present in the water employed or become established through the system.

A further difficulty encountered with certain slimes and related organisms is that of odor. Many of the slime-forming bacteria, particularly of the anaerobic type, are directly responsible for the development of odors which are highly objectionable under any conditions, but more particularly, when imparted to and taken up by food products, paper and paper-board to be employed in food containers, and the like. The foregoing problems have led to the development of a wide variety of treatments for the control of slime-forming bacteria, yeasts, fungi, and algae.

Among the products which have been employed for the control of slime and algae are such varied materials as chlorine, chloramine T, chlorine-ammonia complexes, copper sulfate, potassium permanganate, mercury derivatives, zinc salts, and the polychlorophenols and their salts. Knowing the nature of the slimy deposits and bodies produced within a given circulating system, it has been possible to employ particular chemical compounds to kill or suppress specific organisms. Unfortunately, however, to accomplish a quick control of the assorted micro-flora within any given system, it has been found necessary to employ a multiplicity of treatments each specific to but one or to a small group of the organisms concerned. Thus, in a representative mill, copper sulfate might well be employed to control algae or a slime-forming fungi, but chlorine or chloramine would be required in order to accomplish the inhibition of bacterial growth. In the same system it might further be necessary or desirable to employ a zinc salt or other bactericidal material to control organisms not vulnerable to the action of copper sulfate and chlorine. Such multiphase control methods are expensive, time-consuming, and not always reliable, either by reason of the presence in the system of organisms not controlled by any one of the several toxicants employed or by failure of the operator to carry out the addition of the toxicants in such fashion as to maintain in the system inhibitory and/or toxic concentrations of the several toxicants employed.

A recent development in slime and algae control has been that of employing the polychlorophenols and their soluble salts in confined circulating water systems for the control of micro-organisms. While the use of these compounds constitutes a definite advance over the control measures previously available, there are certain limitations with respect to their use in the control of slime-forming bacteria and fungi which make desirable the provision of improved methods and compositions. Thus, while low dilutions of such phenol compounds may give control against certain of the algae and filamentous fungi of the mold type such as members of the genera Penicillium, Aspergillus, and Trichoderma, they do not accomplish a quick kill of coliform and coliform-like bacteria such as the genera Escherichia and Aerobacter, spore-bearing types such as *Bacillus peptogenes* and *Bacillus megatherium*, and pseudo yeasts and yeast-like fungi such as Oidium, except at excessively high concentrations. Also the polychlorophenols and their simple salts are so fugitive that, even though a measure of inhibition is initially obtained, inhibiting concentrations of the toxicant must be continually added to and maintained in the system else the mycelia and spores of the temporarily controlled organisms resume growth, frequently in a more prolific fashion than prior to treatment.

It is an object of the present invention to provide an improved method and composition for the control of all slime-forming and related microorganisms. It is a further object to supply such a composition which will be effective at lower concentrations than those hitherto known. An additional object is to provide a method and composition for slime control which will accomplish a quick kill of the objectionable organisms rather than a temporary inhibition or delayed control such as has characterized control measures heretofore employed. Other objects of the invention will become apparent from the following specification and examples.

I have discovered that the disadvantages accruing to known slime control methods can be largely avoided by the use of a combination of (A) a water-soluble copper salt and (B) a water-soluble trichlorophenolate as the effective toxic principal. The presence in water, and aqueous solutions and suspensions of low concentrations of copper ions and of trichlorophenol molecules accomplishes a quick kill of slime-forming and related organisms, generally, so that supplementary control measures are not required.

The proportions of the copper salt and trichlorophenolate employed according to the present invention are such that a reciprocal activation occurs as between the copper ions and the trichlorophenol molecules. This is evidenced by the fact that the control obtained with the combination of material is synergistic or greater than additive with respect to the controls obtainable with the individual components of the combination. The increase in effectiveness is many-fold and the more surprising by reason of the fact that copper trichlorophenolates in similar use have a low degree of effectiveness by comparison. Also the latter compounds are relatively water-insoluble, whereby their introduction into aqueous systems is but difficultly accomplished. The present invention avoids such complications by reason of the fact that the copper salt and phenolate may be introduced in a single operation as a dry mixture or separately in a two step procedure and in either method of operation are readily soluble in water.

As has been indicated, any suitable proportions of copper salt and phenolate may be employed provided only that the selected amounts be such that in water solution a reciprocal activation is accomplished. In practice it has been found that for an amount of soluble copper salt embodying 1 part by weight of copper, an amount of phenolate prepared from or embodying from 0.1 to 30 parts by weight of trichlorophenol should be employed. The effective concentration of the combination to be employed in an aqueous medium varies between 5 and 50 parts per million or higher depending upon the particular organisms to be controlled and the temperature and other conditions under which control is to be accomplished.

Any water-soluble copper salt may be employed in accordance with the invention, e. g. copper sulfate, copper acetate, copper chloride, copper bromide, copper nitrate, etc. The foregoing compounds are all cupric derivatives. However, solutions of cuprous ions are soon oxidized to the cupric form so that to all intents and purposes all soluble copper salts are equivalents. Among the phenolates which are employed in combination with the copper salt are sodium 2.4.5-trichlorophenolate, potassium 2.4.5-trichlorophenolate, ammonium 2.4.5-trichlorophenolate, triethanolamine salt of 2.4.5-trichlorophenol, sodium 2.4.6-trichlorophenolate, ammonium 2.4.6-trichlorophenolate, sodium 2.5.6-trichlorophenolate, sodium 2.3.4-trichlorophenolate, potassium 3.4.5-trichlorophenolate, etc.

The preferred embodiment of the invention concerns a combination of a copper ion-yielding material such as a salt and a water-soluble salt of an unsymmetrical trichlorophenol. Such combination of unsymmetrical trichlorophenolate and water-soluble copper salt has been found to exert toxic effects against slime-forming organisms to a degree many times that characterizing similar combinations embodying the 2.4.6-trichlorophenolates. In this embodiment of the invention, from 1 to 18 parts by weight of the phenolate is employed per part of copper salt. The combination of toxicants is generally used in the amount of from 5 to 20 parts per million in water or other aqueous media.

In operating in accordance with the present invention, the combination of toxicants may be employed in any suitable manner. Thus, a dry phenolate such as sodium 2.4.5-trichlorophenolate may be ground with a solid copper salt such as copper sulfate to obtain a finely-divided toxicant mixture which may be added directly to a circulating system at any point and distributed therefrom in solution throughout the body of liquid requiring treatment. Similarly, such mixture of toxicants may be made up in the form of briquettes and the circulating fluid passing in contact therewith at such a rate and in such a quantity as to introduce into the system the desired concentration of the toxic mixture. Other modes of operation include adding the phenolate and copper salt separately to the system as crystalline solids, as dusts, as aqueous solutions, or, in the case of the phenolate, as a solution in water-miscible organic solvent. Regardless of the procedure employed, care should be exercised that there be no reaction between the copper salt and phenolate prior to addition, since it has been found that the pre-formed copper salts of trichlorophenols are much less effective against slime organisms than is the combination of copper ions and phenol molecules obtained when the copper salt and soluble phenolate per se are dissolved in the media to be preserved.

A further embodiment of the invention which provides for an optimum control of the formation of certain types of slime deposits and operates to soften and dislodge previously deposited slime bodies from the surfaces of pipes, conduits, and machinery is that of employing with the mixture of toxicants a considerable excess of alkali. This procedure is particularly advantageous where it is desired to flush a system containing heavy slime deposits, to accomplish a quick control of existing contamination, and to prevent a recurrence of the undesirable conditions under treatment. In such operation the alkali, in the form of sodium hydroxide or otherwise, may be added in conjunction with the phenolate and/or copper salt or separately as is convenient or practical.

The expression "slime forming organism" as herein employed is inclusive of algae and of micro-organisms such as bacteria, yeast-like fungi, and molds. The micro-organisms may be classified in a general way as (1) coliform and coliform-like bacteria belonging to the genera Escherichia and Aerobacter; (2) non-spore-bearing types belonging to the genera Proteus, Alcaligenes, Pseudomonas, Achromobacter, Flavobacterium, and species related to the "soft rot" group of bacteria; (3) spore-bearing bacteria such as the *Bacillus peptogenes* group (slime forming varieties of *Bacillus subtilis*), *Bacillus mesentericus* (syn *Bacillus pumilus*), the *Bacillus megatherium* group, and various thermophilic and anaerobic types; (4) filamentous mold-like bacteria belonging to the genus Actinomyces, and special groups such as the iron bacteria that sometimes develop in water supplies; (5) pseudo yeasts and yeast-like fungi such as Torula, Oidium, Monilia, Endomyces and related groups; and (6) filamentous fungi of the mold type including members of the genera Penicillium, Aspergillus, Trichoderma, Cladosporium, Cephalosporium, Botrytis, Acrostalagmus, Alternaria, Spicaria and Clonostachys. Representative slime formations and deposits as formed by these organisms are described as gelatinous or viscous from the non-spore-bearing bacteria, pasty or doughy from the yeast-like fungi, stringy or ropy from the spore-bearing bacteria, rubbery or leathery from the yeast-like fungi, and hard and matted from the yeast-like fungi and molds. Among the microorganisms included within the expression "slime-forming organisms" are related bacteria, and particularly those imparting odor to systems in which they are found and those producing hydrogen sulfide gas or other products commonly found to cause corrosion in circulating water systems.

In investigating the combination of toxicants to which the present invention is directed and in comparing the constituents of such combinations, the rapid killing action of the toxicant under test was taken as the index of effectiveness. According to this toxicity determination, the ability of aqueous dilutions of toxicant to kill various micro-organisms in 10 minutes contact time and at 25°–27° C. in fluid systems was observed. The exact procedure followed consists of introducing into a dilute solution of the toxicant in water, a 0.5 cubic centimeter portion of a filtered culture of the organism in sterile potato-glucose broth dispersion. The resulting mixture is allowed to stand for 10 minutes at 25°–27° C. with mild agitation. At the end of this time the mixture is sub-cultured in sterile potato-glucose broth and such sub-cultures incubated at 28° C. for 7 days in the case of fungi, and at 37° C. for 48 hours in the case of bacteria. The sub-cultures are then subjected to visual and/or microscopic examination to determine the presence or absence of living organisms. No effort is made to estimate degree of control, all results being reported as either plus or minus with respect to complete control for the particular dilution of toxicants employed.

Example 1

Sodium 2.4.5-trichlorophenolate and copper sulfate.$5H_2O$ were employed in combination for the control of a variety of slime organisms. The proportions of the two materials were varied considerably and in each instance the toxicity of the combination was determined by separately dissolving the copper salt and phenolate in a measured amount of water and thereafter adding additional water to obtain dilutions of as great as 1 part of the toxic combination in 80,000 parts of water. Toxicity determinations were also carried out with aqueous solutions of sodium 2.4.5-trichlorophenolate alone and of copper sulfate alone. The following table sets forth the results obtained against representative slime-forming organisms in terms of the maximum dilutions of toxicant giving a complete kill of the organism in 10 minutes' exposure.

Table I

| Composition | Toxicant | Aerobacter aerogenes (gummy) | Aerobacter aerogenes (slimy) | Aerobacter cloacae (slimy) | Escherichia coli (slimy) | Penicillium sp. (slime-forming) | Trichoderma sp. (slime-forming) | Oidium sp. (slime-forming) | Aspergillus fumigatus |
|---|---|---|---|---|---|---|---|---|---|
| A | 1 part by wt. copper sulfate.$5H_2O$. 1.17 parts by wt. sodium 2.4.5-trichlorophenolate. | Greater than 1–80,000. | Greater than 1–80,000. | Greater than 1–80,000. | Greater than 1–80,000. | Greater than 1–80,000. | Greater than 1–80,000. | Greater than 1–80,000. | Greater than 1–80,000. |
| B | 1 part by wt. copper sulfate.$5H_2O$. 1.75 parts by wt. sodium 2.4.5-trichlorophenolate. | ----do------ | ----do------ | ----do------ | ----do------ | ----do------ | ----do------ | ----do------ | Do. |
| C | 1 part by wt. copper sulfate.$5H_2O$. 2.34 parts by wt. sodium 2.4.5-trichlorophenolate. | ----do------ | ----do------ | ----do------ | ----do------ | ----do------ | ----do------ | ----do------ | Do. |
| D | Sodium 2.4.5-trichlorophenolate. | Not effective at 1–500. | Not effective at 1–500. | Not effective at 1–500. | Not determined. | Between 1–1,000 and 1–2,500. | Between 1–1,000 and 1–2,500. | Not effective at 1–500. | Between 1–500 and 1–1,000. |
| E | Copper sulfate.$5H_2O$. | Not effective at 1–20. | Not effective at 1–20. | Not determined. | ----do------ | Not effective at 1–20. | Not effective at 1–20. | Not effective at 1–20. | Not effective at 1–20. |

It is evident from the foregoing table that each of the combinations embodying the copper ions and 2.4.5-trichlorophenol structure was effective against all organisms at dilutions of 1–80,000. In contrast, the constituents of the combination were relatively ineffective. The sodium 2.4.5-trichlorophenolate gave a rather selective control against certain organisms at a dilution of from 1–1,000 to 1–2,500 and in other instances failed to control at as low a dilution as 1–500. Similarly, copper sulfate failed to show effectiveness against any of the test organisms at a dilution of 1–20. The control accomplished by the combination of toxicants is seen to be greater than additive and indicates a reciprocal activation between the copper salt and phenolate.

Example 2

*Aerobacter aerogenes* (gummy) was employed as a test organism against which combinations of sodium 2.4.6-trichlorophenolate with copper sulfate.$5H_2O$ were employed. Control determinations were carried out with the phenolate alone. The following table sets forth the results obtained in terms of the maximum dilutions accomplishing a complete kill of the organism in 10 minutes' exposure.

Table II

| Composition | Toxicant | Maximum effective dilution |
|---|---|---|
| F | 1 part by weight of copper sulfate.$5H_2O$ / 0.5 part by weight of sodium 2.4.6-trichlorophenolate | Between 1-10,000 and 1-20,000. |
| G | 1 part by weight of copper sulfate.$5H_2O$ / 1 part by weight of sodium 2.4.6-trichlorophenolate | Between 1-10,000 and 1-20,000. |
| H | 1 part by weight of copper sulfate.$5H_2O$ / 5 parts by weight of sodium 2.4.6-trichlorophenolate | Greater than 1-20,000. |
| I | 1 part by weight of copper sulfate.$5H_2O$ / 15 parts by weight of sodium 2.4.6-trichlorophenolate | Greater than 1-20,000. |
| J | Sodium 2.4.6-trichlorophenolate | Between 1-1,000 and 1-5,000. |
| K | Copper sulfate.$5H_2O$ | Not effective at 1-20. |

EXAMPLE 3

In a similar fashion determinations were carried out in which the copper salt of 2.4.5-trichlorophenol was compared with a mixture of 1 gram molecular weight of sodium 2.4.5-trichlorophenolate and 0.5 gram molecular weight of copper sulfate. These materials were applied at low dilution for the control of representative slime-forming fungi, bacteria, and yeasts. It was found that the concentration of copper 2.4.5-trichlorophenolate required to accomplish control of the slime organisms as a group was at least 10 times that required for the combination of phenolate and copper salt. This comparison was made on the basis of the maximum dilution of the copper phenolate and combination of toxicants to kill the test organisms in a 10 minute exposure period.

I claim:

1. A method for the control of slime formation in circulating water systems comprising the step of introducing into the water from 5 to 20 parts per million of a combination of (A) 1.0 part by weight of water-soluble copper salt and (B) from 1 to 18 parts by weight of a water-soluble trichlorophenolate, the copper salt and phenolate being added separately to the system.

2. A method for the control of slime formation in circulating water systems comprising the step of introducing into the water from 5 to 20 parts per million of a combination of (A) 1.0 part by weight of copper sulfate and (B) from 1 to 18 parts by weight of sodium 2.4.5-trichlorophenolate.

3. A method for the control of slime formation in circulating water systems comprising the step of introducing into the water free alkali and at least 5 parts per million of a combination of (A) 1.0 part by weight of a water-soluble copper salt, and (B) from 1 to 18 parts by weight of a water-soluble trichlorophenolate.

4. A method for the control of slime formation in circulating water systems comprising the step of introducing into the water at least 5 parts per million of a combination of (A) 1.0 part by weight of a water-soluble copper salt and (B) from 1 to 18 parts by weight of a water-soluble trichlorophenolate.

WILLIAM W. ALLEN.